United States Patent
Inoue et al.

(10) Patent No.: US 12,542,879 B2
(45) Date of Patent: Feb. 3, 2026

(54) CONTROL DEVICE, CONTROL METHOD, CONTROL PROGRAM, AND PROJECTION APPARATUS

(71) Applicant: FUJIFILM Corporation, Tokyo (JP)

(72) Inventors: Kazuki Inoue, Saitama (JP); Kazuki Ishida, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 258 days.

(21) Appl. No.: 18/450,470

(22) Filed: Aug. 16, 2023

(65) Prior Publication Data

US 2023/0388462 A1    Nov. 30, 2023

Related U.S. Application Data

(63) Continuation of application No. PCT/JP2022/003613, filed on Jan. 31, 2022.

(30) Foreign Application Priority Data

Feb. 26, 2021  (JP) .................. 2021-030085

(51) Int. Cl.
*H04N 9/31* (2006.01)
*G09G 3/00* (2006.01)

(52) U.S. Cl.
CPC ........... *H04N 9/3182* (2013.01); *G09G 3/001* (2013.01); *G09G 2320/0233* (2013.01); *G09G 2320/0242* (2013.01); *G09G 2320/0666* (2013.01)

(58) Field of Classification Search
None
See application file for complete search history.

(56) References Cited

U.S. PATENT DOCUMENTS

| 2015/0130827 A1* | 5/2015 | Mizushiro ............ H04N 9/3182 345/589 |
| 2017/0205698 A1 | 7/2017 | Ozawa |
| 2018/0247601 A1 | 8/2018 | Chen et al. |

(Continued)

FOREIGN PATENT DOCUMENTS

| JP | 2003-18502 A | 1/2003 |
| JP | 2003-143620 A | 5/2003 |
| JP | 2008-225031 A | 9/2008 |

(Continued)

OTHER PUBLICATIONS

International Preliminary Report on Patentability and Written Opinion of the International Searching Authority (Forms PCT/IB/326, PCT/IB/373 and PCT/ISA/237) for International Application No. PCT/JP2022/003613, dated Sep. 7, 2023, with English translation.

(Continued)

*Primary Examiner* — Yingchun He
(74) *Attorney, Agent, or Firm* — Birch, Stewart, Kolasch & Birch, LLP

(57) ABSTRACT

A control device of a projection apparatus that projects an image optically modulated by a light modulation element, includes: a processor, and the processor is configured to perform a control of correcting color shading of a projection image that is projected, based on combined use of output adjustment of a light source used in the projection by the projection apparatus and adjustment of image data input into the light modulation element.

17 Claims, 11 Drawing Sheets

(56) References Cited

U.S. PATENT DOCUMENTS

2020/0267356 A1\* 8/2020 Kubota ................ G03B 21/142

FOREIGN PATENT DOCUMENTS

| JP | 2016-143015 A | 8/2016 |
| JP | 2017-129698 A | 7/2017 |
| WO | WO 2016/157670 A1 | 10/2016 |

OTHER PUBLICATIONS

International Search Report (Form PCT/ISA/210) for International Application No. PCT/JP2022/003613, dated Apr. 12, 2022, with English translation.
Japanese Office Action for corresponding Japanese Application No. 2023-502219, dated May 13, 2025, with English translation.
Japanese Office Action for corresponding Japanese Application No. 2023-502219, dated Aug. 12, 2025, with English translation.

\* cited by examiner

FIG. 5
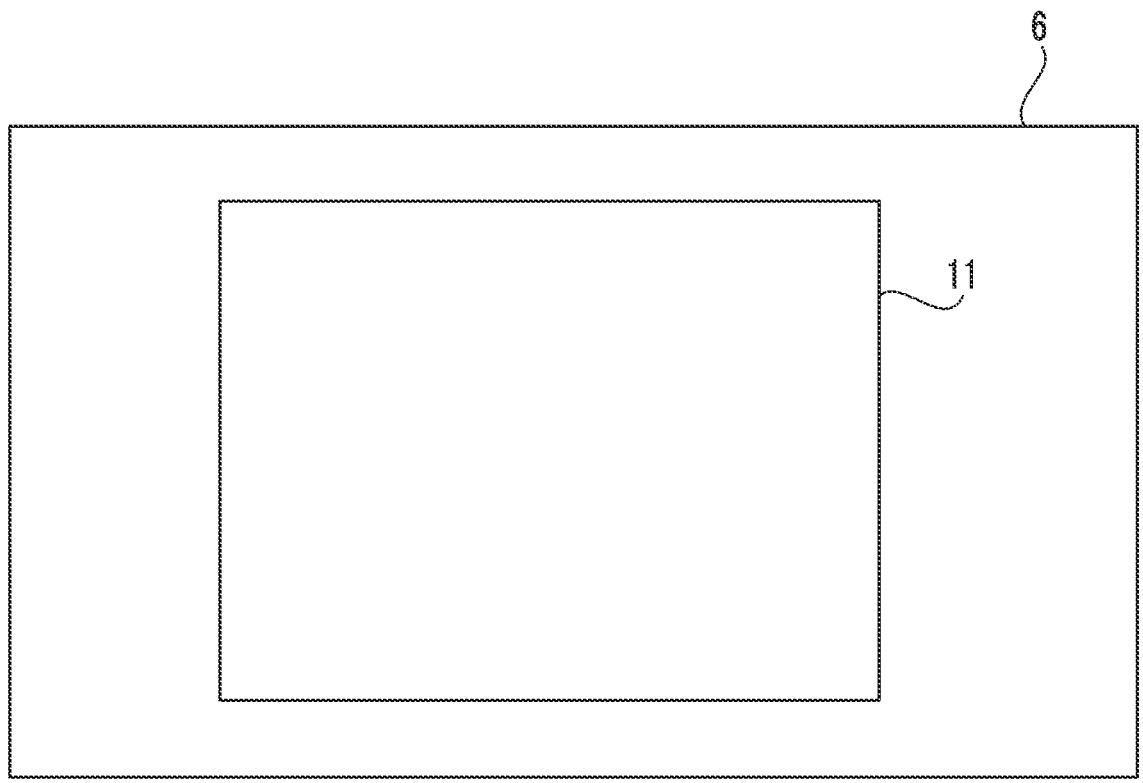
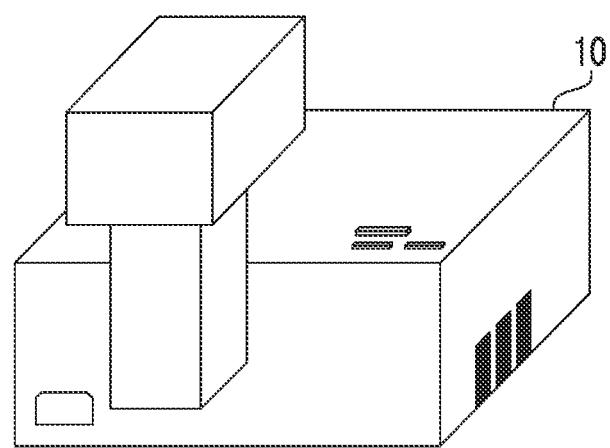

FIG. 6
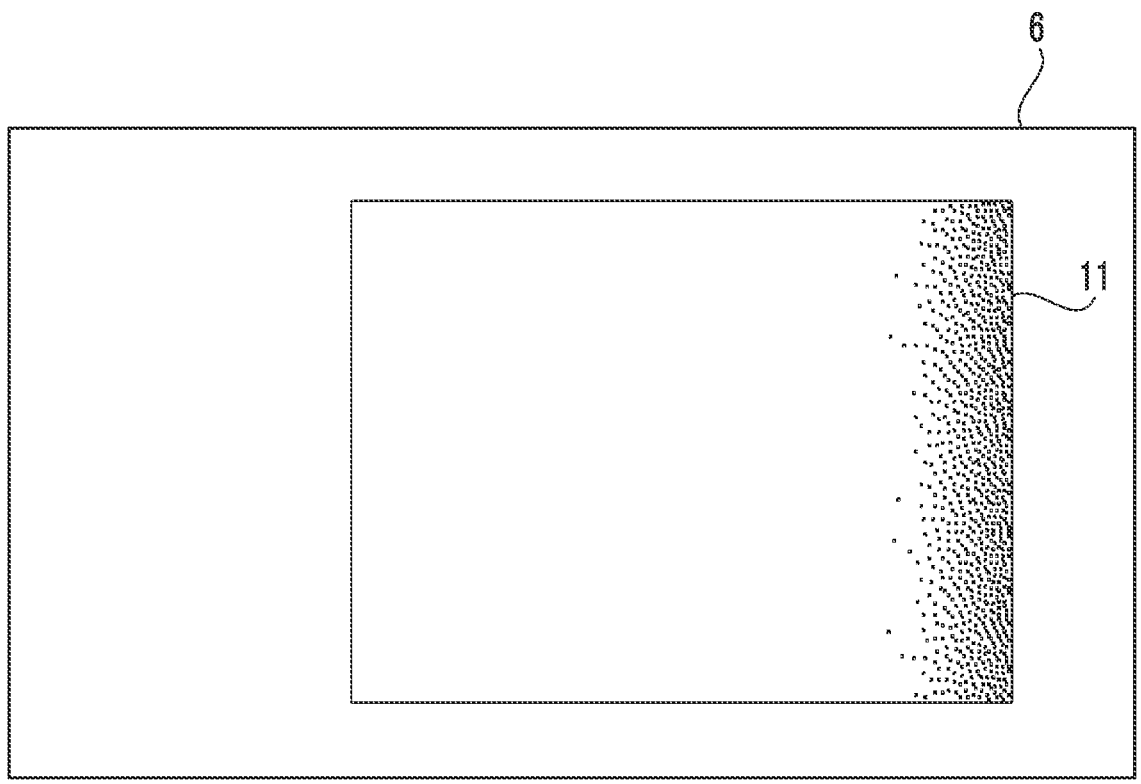
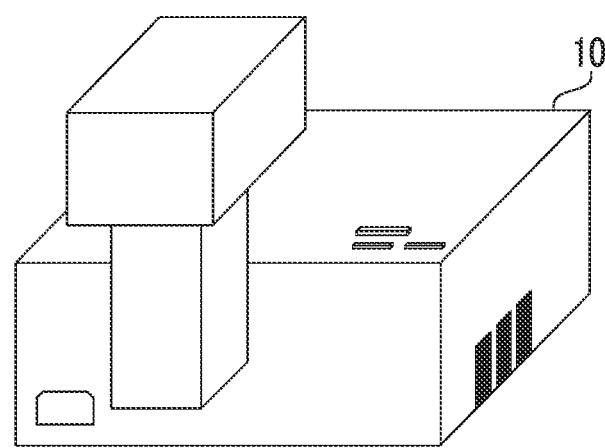

FIG. 7
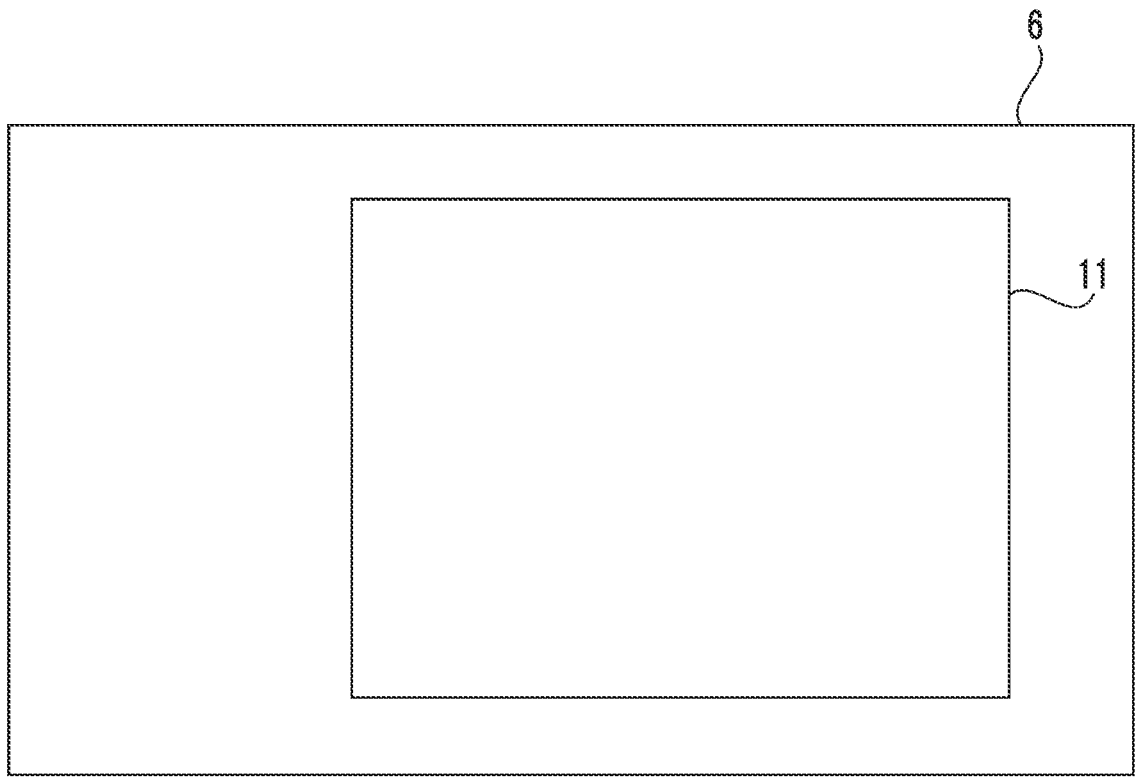
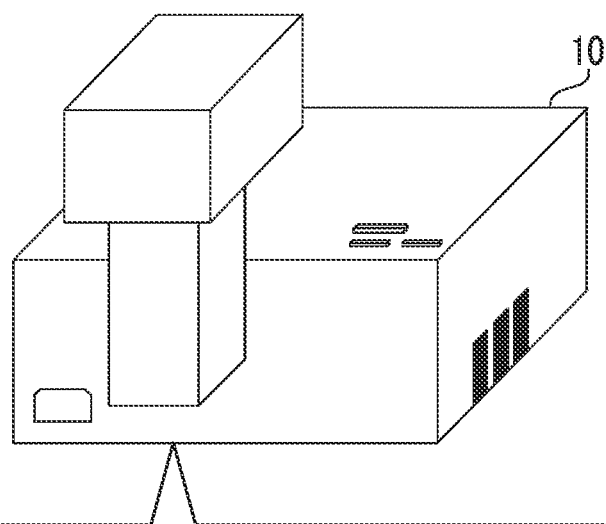
OUTPUT ADJUSTMENT OF LIGHT
SOURCE + ADJUSTMENT OF IMAGE DATA

CONTROL DEVICE, CONTROL METHOD, CONTROL PROGRAM, AND PROJECTION APPARATUS

CROSS REFERENCE TO RELATED APPLICATION

This is a continuation of International Application No. PCT/JP2022/003613 filed on Jan. 31, 2022, and claims priority from Japanese Patent Application No. 2021-030085 filed on Feb. 26, 2021, the entire disclosures of which are incorporated herein by reference.

BACKGROUND OF THE INVENTION

1. Field of the Invention

The present invention relates to a control device, a control method, a computer readable medium storing a control program, and a projection apparatus.

2. Description of the Related Art

JP2003-18502A discloses performing an operation of detecting unevenness in the entire video by measuring illuminance and chromaticity at a position of each part obtained by dividing the video projected on a screen through a projector optical system, independently setting a driving level at a position of a liquid crystal panel corresponding to each part, and storing setting data in a memory as unevenness correction data, for lens shift positions of a plurality of different projection lenses and, in a case where a liquid crystal projector is used, detecting a lens shift position, reading the unevenness correction data corresponding to the lens shift position from the memory, and determining the driving level of the liquid crystal panel from the correction data corresponding to each position of the liquid crystal panel.

JP2003-143620A discloses automatically correcting color unevenness by storing, in advance, a predetermined projection position within a projection range of a projection lens and a correction coefficient for correcting color unevenness at a predetermined zooming position within a zoom range of the projection lens in accordance with the predetermined projection position, detecting projection position data within the projection range of the projection lens, detecting zooming position data within the zoom range of the projection lens in association with the projection position, obtaining, by performing interpolated value calculation, a color unevenness correction coefficient corresponding to the detected projection position and to the detected zooming position from the stored predetermined projection position and from the stored color unevenness correction coefficient at the predetermined zooming position, and applying the color unevenness correction coefficient obtained by performing the interpolated value calculation to a video signal.

JP2016-143015A discloses, in a projector, performing adjustment related to image quality corresponding to a position of a projection lens by receiving an input for selecting the position of the projection lens, adjusting the position of the projection lens in accordance with the position of the projection lens selected in accordance with the received input, and controlling a light modulation device in accordance with a setting related to formation of image light corresponding to the selected position of the projection lens.

SUMMARY OF THE INVENTION

One embodiment according to the disclosed technology provides a control device, a control method, a computer readable medium storing a control program, and a projection apparatus that can improve projection quality.

A control device according to an aspect of the present invention is a control device of a projection apparatus that projects an image optically modulated by a light modulation element, the control device comprising a processor, in which the processor is configured to perform a control of correcting color shading of a projection image that is projected, based on combined use of output adjustment of a light source used in the projection by the projection apparatus and adjustment of image data input into the light modulation element.

A control method according to another aspect of the present invention is a control method performed by a control device of a projection apparatus that projects an image optically modulated by a light modulation element, the control method comprising performing, via a processor of the control device, a control of correcting color shading of a projection image that is projected, based on combined use of output adjustment of a light source used in the projection by the projection apparatus and adjustment of image data input into the light modulation element.

A control program, which is stored in a computer readable medium, according to still another aspect of the present invention is a control program of a projection apparatus that projects an image optically modulated by a light modulation element, the control program causing a processor configured to control the projection apparatus to execute a process comprising performing a control of correcting color shading of a projection image that is projected, based on combined use of output adjustment of a light source used in the projection by the projection apparatus and adjustment of image data input into the light modulation element.

A projection apparatus according to still another aspect of the present invention comprises a projection portion that projects an image optically modulated by a light modulation element, and a control device that performs a control of correcting color shading of a projection image that is projected, based on combined use of output adjustment of a light source used in the projection by the projection portion and adjustment of image data input into the light modulation element.

According to the present invention, a control device, a control method, a computer readable medium storing a control program, and a projection apparatus that can improve projection quality can be provided.

BRIEF DESCRIPTION OF THE DRAWINGS

FIG. 5 is a diagram illustrating an example of a projection image before shifting.

FIG. 6 is a diagram illustrating an example of the projection image after shifting.

FIG. 7 is a diagram illustrating an example of correction of color shading by a control device 4.

DESCRIPTION OF THE PREFERRED EMBODIMENTS

Hereinafter, an example of an embodiment of the present invention will be described with reference to the drawings.

Embodiment

Figure 1:
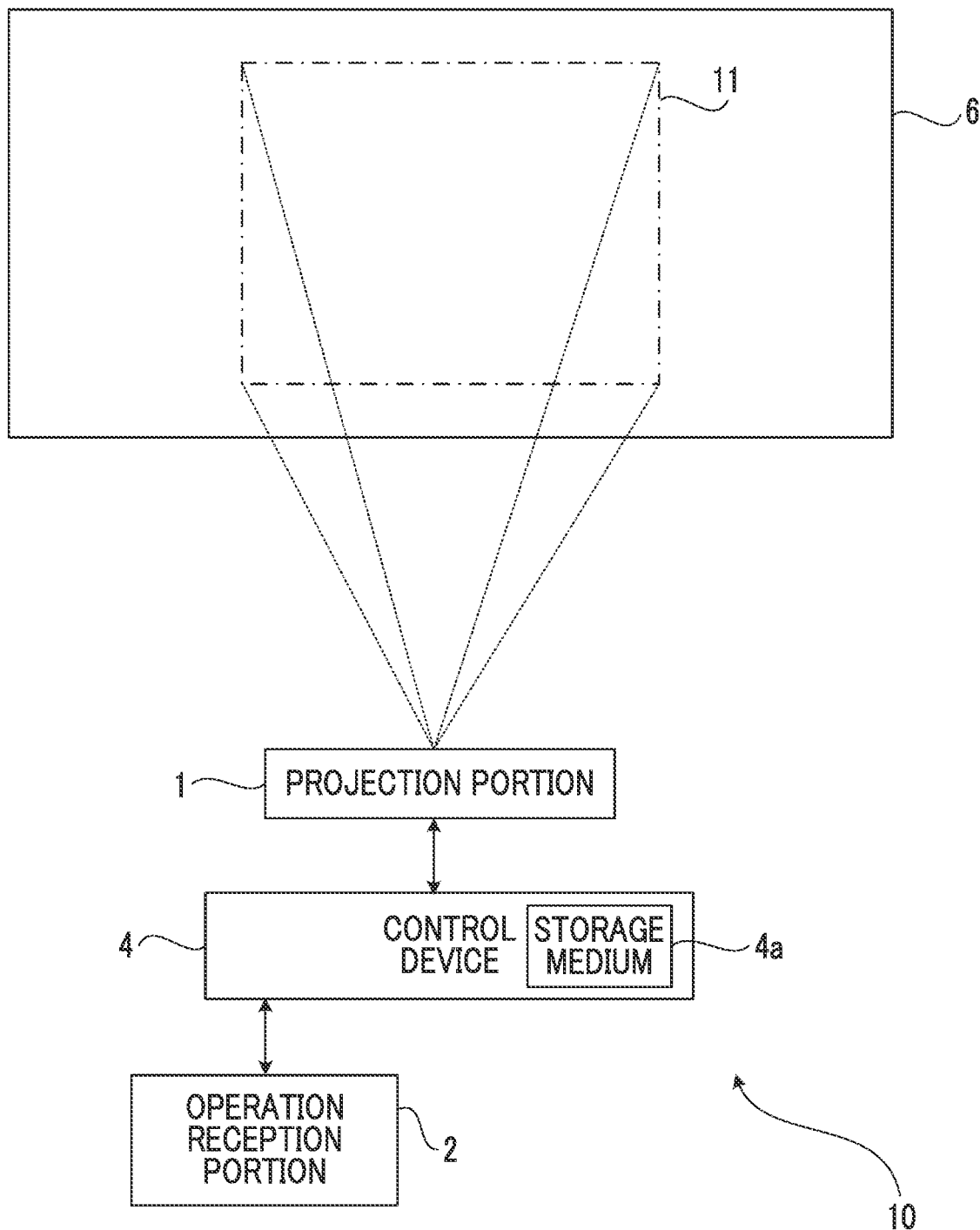
FIG. 1 is a schematic diagram illustrating a schematic configuration of a projection apparatus 10 to which a control device of an embodiment is applied.

Schematic Configuration of Projection Apparatus 10 to which Control Device of Embodiment is Applied FIG. 1 is a schematic diagram illustrating a schematic configuration of a projection apparatus 10 to which a control device of the embodiment is applied.

The projection apparatus 10 comprises a projection portion 1, a control device 4, and an operation reception portion 2. The projection portion 1 is composed of, for example, a liquid crystal projector or of a projector using liquid crystal on silicon (LCOS). Hereinafter, the projection portion 1 will be described as a liquid crystal projector.

The control device 4 controls projection performed by the projection apparatus 10. In addition, the control device 4 is an example of the control device according to the embodiment of the present invention. The control device 4 is a device including a control portion composed of various processors, a communication interface (not illustrated) for communicating with each portion, and a storage medium 4a such as a hard disk, a solid state drive (SSD), or a read only memory (ROM) and manages and controls the projection portion 1. Examples of the various processors of the control portion of the control device 4 include a central processing unit (CPU) that is a general-purpose processor performing various types of processing by executing a program, a programmable logic device (PLD) such as a field programmable gate array (FPGA) that is a processor having a circuit configuration changeable after manufacture, or a dedicated electric circuit such as an application specific integrated circuit (ASIC) that is a processor having a circuit configuration dedicatedly designed to execute specific processing.

More specifically, a structure of these various processors is an electric circuit in which circuit elements such as semiconductor elements are combined. The control portion of the control device 4 may be composed of one of the various processors or may be composed of a combination of two or more processors of the same type or different types (for example, a combination of a plurality of FPGAs or a combination of a CPU and an FPGA).

The operation reception portion 2 detects an instruction (user instruction) from a user by receiving various operations from the user. In the present embodiment, the operation reception portion 2 is an operation portion such as a button, a key, or a joystick provided in a body of the projection apparatus 10. Accordingly, in a case where the operation reception portion 2 is operated, it can be determined that the user is positioned near the projection apparatus 10.

A projection target object 6 is an object such as a screen having a projection surface on which a projection image is displayed by the projection portion 1. In the example illustrated in FIG. 1, the projection surface of the projection target object 6 is a rectangular plane. It is assumed that upper, lower, left, and right sides of the projection target object 6 in FIG. 1 are upper, lower, left, and right sides of the actual projection target object 6.

A projection range 11 illustrated by a dot dashed line is a region irradiated with projection light by the projection portion 1 in the projection target object 6. In the example illustrated in FIG. 1, the projection range 11 is rectangular. The projection range 11 is a part or the entirety of a projectable range to which the projection can be performed by the projection portion 1.

Figure 3:
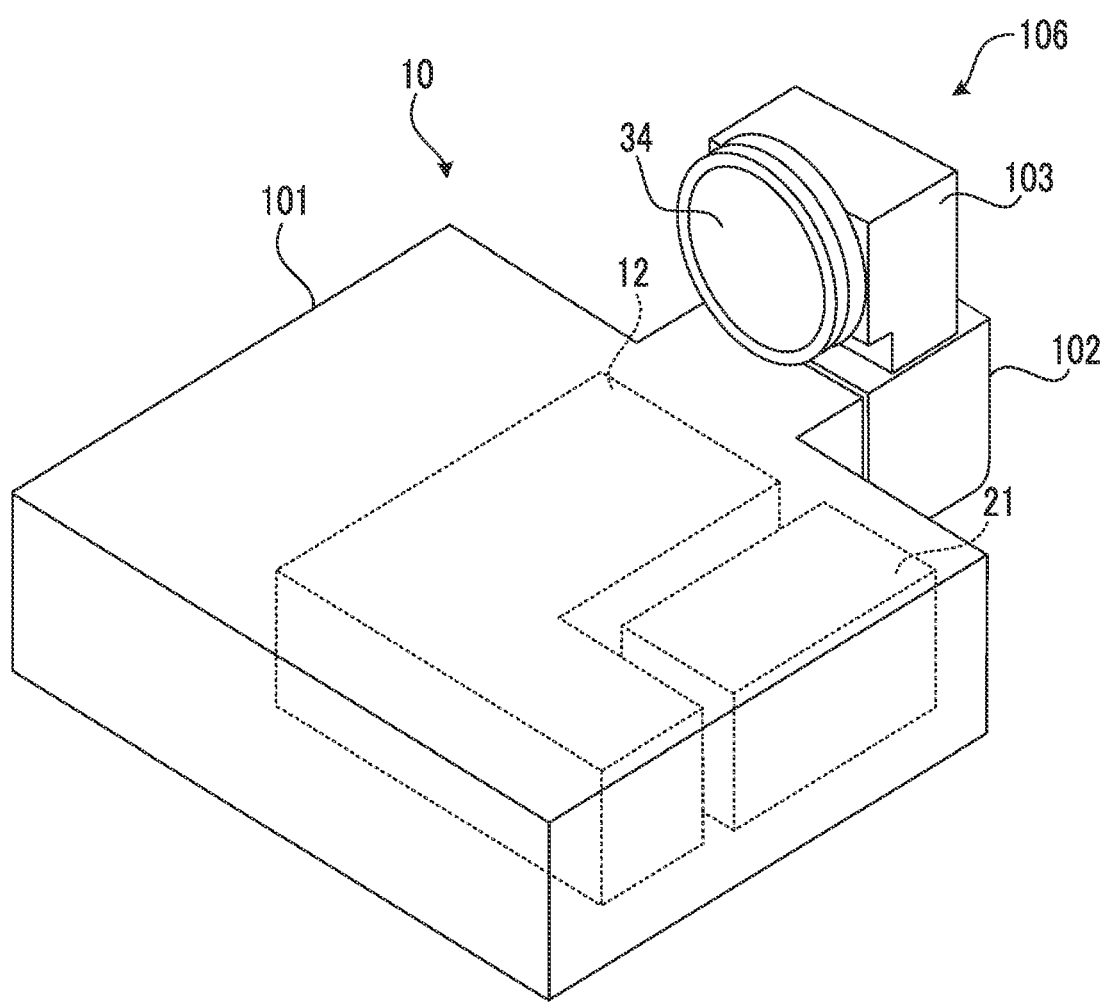
FIG. 3 is a schematic diagram illustrating an exterior configuration of the projection apparatus 10.
Figure 4:
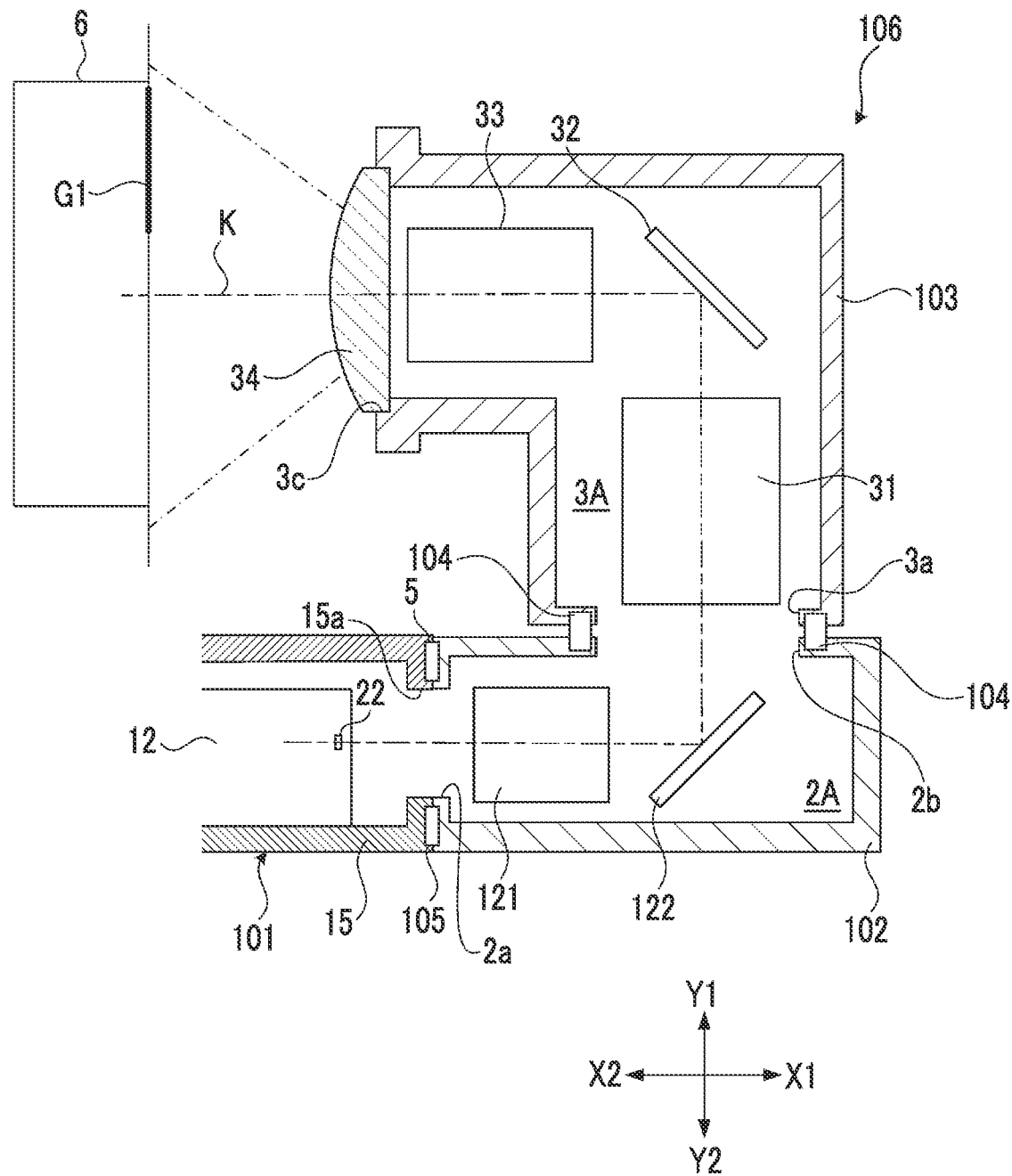
FIG. 4 is a schematic cross-sectional view of an optical unit 106 of the projection apparatus 10 illustrated in FIG. 3.

The projection portion 1, the control device 4, and the operation reception portion 2 are implemented by, for example, one device (for example, refer to FIG. 3 and FIG. 4). Alternatively, the projection portion 1, the control device 4, and the operation reception portion 2 may be separate devices that cooperate with each other through communication.

<Internal Configuration of Projection Portion 1 Illustrated in FIG. 1>

Figure 2:
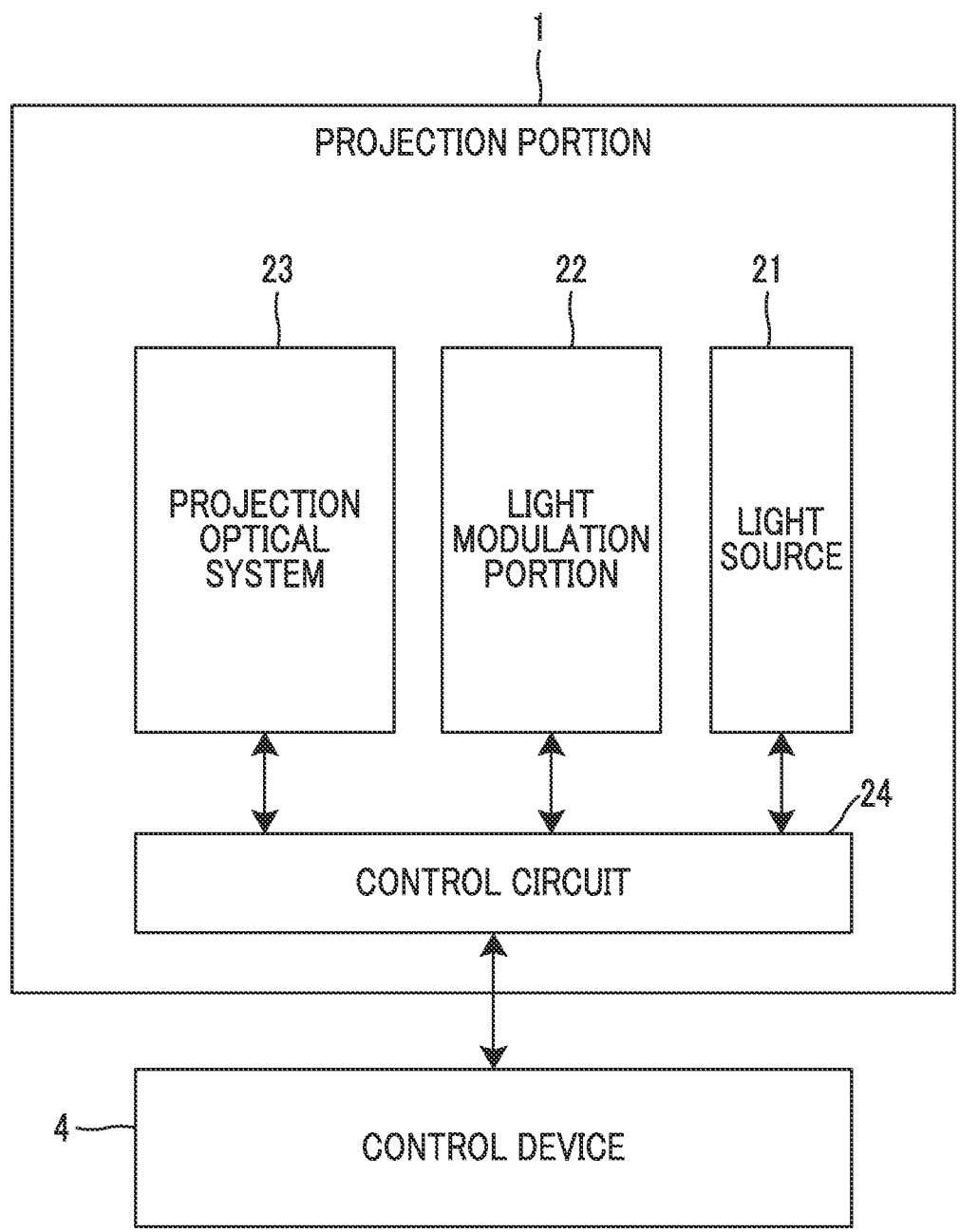
FIG. 2 is a schematic diagram illustrating an example of an internal configuration of a projection portion 1 illustrated in FIG. 1.

FIG. 2 is a schematic diagram illustrating an example of an internal configuration of the projection portion 1 illustrated in FIG. 1.

As illustrated in FIG. 2, the projection portion 1 comprises a light source 21, a light modulation portion 22, a projection optical system 23, and a control circuit 24.

The light source 21 includes a light emitting element such as a laser or a light emitting diode (LED) and emits, for example, white light.

The light modulation portion 22 is a light modulation element composed of three liquid crystal panels that modulate, based on image information, color light of each of three colors of red, blue, and green which is emitted from the light source 21 and which is separated by a color separation mechanism, not illustrated, and that emit images of each color. Filters of red, blue, and green may be mounted in the three liquid crystal panels, respectively, and the images of each color may be emitted by modulating the white light emitted from the light source 21 in each liquid crystal panel.

The light from the light source 21 and the light modulation portion 22 is incident on the projection optical system 23. The projection optical system 23 includes at least one lens and is composed of, for example, a relay optical system. The light that has passed through the projection optical system 23 is projected to the projection target object 6.

In the projection target object 6, a region irradiated with the light transmitted through the entire range of the light modulation portion 22 is the projectable range to which the projection can be performed by the projection portion 1. In the projectable range, a region irradiated with the light actually transmitted through the light modulation portion 22 is the projection range 11. For example, in the projectable range, a size, a position, and a shape of the projection range 11 are changed by controlling a size, a position, and a shape of a region through which the light is transmitted in the light modulation portion 22.

The control circuit 24 projects an image based on display data to the projection target object 6 by controlling the light source 21, the light modulation portion 22, and the projection optical system 23 based on the display data input from the control device 4. The display data input into the control circuit 24 is composed of three constituents of red display data, blue display data, and green display data.

In addition, the control circuit 24 enlarges or reduces the projection range 11 (refer to FIG. 1) of the projection portion 1 by changing the projection optical system 23 based on an instruction input from the control device 4. In addition, the control device 4 may move the projection range 11 of the projection portion 1 by changing the projection optical system 23 based on the operation received by the operation reception portion 2 from the user.

In addition, the projection apparatus 10 comprises a shift mechanism that mechanically or optically moves the projection range 11 while maintaining an image circle of the projection optical system 23. The image circle of the projection optical system 23 is a region in which the projection light incident on the projection optical system 23 appropriately passes through the projection optical system 23 in terms of a light fall-off, color separation, edge part curvature, or the like.

The shift mechanism is implemented by at least any of an optical system shift mechanism that performs optical system shifting, or an electronic shift mechanism that performs electronic shifting.

The optical system shift mechanism is, for example, a mechanism (for example, refer to FIG. 3 and FIG. 4) that moves the projection optical system 23 in a direction perpendicular to an optical axis, or a mechanism that moves the light modulation portion 22 in the direction perpendicular to the optical axis instead of moving the projection optical system 23. In addition, the optical system shift mechanism may perform the movement of the projection optical system 23 and the movement of the light modulation portion 22 in combination.

The electronic shift mechanism is a mechanism that performs pseudo shifting of the projection range 11 by changing a range through which the light is transmitted in the light modulation portion 22.

In addition, the projection apparatus 10 may comprise a projection direction changing mechanism that moves the image circle of the projection optical system 23 and the projection range 11. The projection direction changing mechanism is a mechanism that changes a projection direction of the projection portion 1 by changing a direction of the projection portion 1 through mechanical rotation (for example, refer to FIG. 3 and FIG. 4).

<Mechanical Configuration of Projection Apparatus 10>

FIG. 3 is a schematic diagram illustrating an exterior configuration of the projection apparatus 10. FIG. 4 is a schematic cross-sectional view of an optical unit 106 of the projection apparatus 10 illustrated in FIG. 3. FIG. 4 illustrates a cross section in a plane along an optical path of the light emitted from a body part 101 illustrated in FIG. 3.

As illustrated in FIG. 3, the projection apparatus 10 comprises the body part 101 and the optical unit 106 that is provided to protrude from the body part 101. In the configuration illustrated in FIG. 3, the operation reception portion 2, the control device 4, and the light source 21, the light modulation portion 22, and the control circuit 24 in the projection portion 1 are provided in the body part 101. The projection optical system 23 in the projection portion 1 is provided in the optical unit 106.

The optical unit 106 comprises a first member 102 supported by the body part 101 and a second member 103 supported by the first member 102.

The first member 102 and the second member 103 may be an integrated member. The optical unit 106 may be configured to be attachable to and detachable from the body part 101 (in other words, configured to be interchangeable).

The body part 101 includes a housing 15 (refer to FIG. 4) in which an opening 15a (refer to FIG. 4) for passing light is formed in a part connected to the optical unit 106.

As illustrated in FIG. 3, the light source 21 and a light modulation unit 12 including the light modulation portion 22 (refer to FIG. 2) that generates an image by spatially modulating the light emitted from the light source 21 based on input image data are provided inside the housing 15 of the body part 101.

The light emitted from the light source 21 is incident on the light modulation portion 22 of the light modulation unit 12 and is spatially modulated and emitted by the light modulation portion 22.

As illustrated in FIG. 4, the image formed from the light spatially modulated by the light modulation unit 12 is incident on the optical unit 106 by passing through the opening 15a of the housing 15 and is projected to the projection target object 6 as a projection target object. Accordingly, an image G1 is visible from an observer.

As illustrated in FIG. 4, the optical unit 106 comprises the first member 102 including a hollow portion 2A connected to the inside of the body part 101, the second member 103 including a hollow portion 3A connected to the hollow portion 2A, a first optical system 121 and a reflective member 122 disposed in the hollow portion 2A, a second optical system 31, a reflective member 32, a third optical system 33, and a lens 34 disposed in the hollow portion 3A, a shift mechanism 105, and a projection direction changing mechanism 104.

The first member 102 is a member having, for example, a rectangular cross-sectional exterior shape, in which an opening 2a and an opening 2b are formed in surfaces perpendicular to each other. The first member 102 is supported by the body part 101 in a state where the opening 2a is disposed at a position facing the opening 15a of the body part 101. The light emitted from the light modulation portion 22 of the light modulation unit 12 of the body part 101 is incident into the hollow portion 2A of the first member 102 through the opening 15a and through the opening 2a.

An incidence direction of the light incident into the hollow portion 2A from the body part 101 will be referred to as a direction X1. A direction opposite to the direction X1 will be referred to as a direction X2. The direction X1 and the direction X2 will be collectively referred to as a direction X. In addition, a direction from the front to the back of the page of FIG. 4 and an opposite direction thereto will be referred to as a direction Z. In the direction Z, the direction from the front to the back of the page will be referred to as a direction Z1, and the direction from the back to the front of the page will be referred to as a direction Z2.

In addition, a direction perpendicular to the direction X and to the direction Z will be referred to as a direction Y. In the direction Y, an upward direction in FIG. 4 will be referred to as a direction Y1, and a downward direction in FIG. 4 will be referred to as a direction Y2. In the example in FIG. 4, the projection apparatus 10 is disposed such that the direction Y2 is a vertical direction.

The projection optical system 23 illustrated in FIG. 2 is composed of the first optical system 121, the reflective member 122, the second optical system 31, the reflective member 32, the third optical system 33, and the lens 34. An optical axis K of the projection optical system 23 is illustrated in FIG. 4. The first optical system 121, the reflective member 122, the second optical system 31, the reflective member 32, the third optical system 33, and the lens 34 are disposed in this order from the light modulation portion 22 side along the optical axis K.

The first optical system 121 includes at least one lens and guides the light that is incident on the first member 102 from the body part 101 and that travels in the direction X1, to the reflective member 122.

The reflective member 122 reflects the light incident from the first optical system 121 in the direction Y1. The reflective member 122 is composed of, for example, a mirror. In the first member 102, the opening 2b is formed on the optical path of the light reflected by the reflective member 122, and the reflected light travels to the hollow portion 3A of the second member 103 by passing through the opening 2b.

The second member 103 is a member having an approximately T-shaped cross-sectional exterior shape, in which an opening 3a is formed at a position facing the opening 2b of the first member 102. The light that has passed through the opening 2b of the first member 102 from the body part 101 is incident into the hollow portion 3A of the second member 103 through the opening 3a. Cross-sectional exterior shapes of the first member 102 and the second member 103 are arbitrary and are not limited to the above.

The second optical system 31 includes at least one lens and guides the light incident from the first member 102 to the reflective member 32.

The reflective member 32 guides the light incident from the second optical system 31 to the third optical system 33 by reflecting the light in the direction X2. The reflective member 32 is composed of, for example, a mirror.

The third optical system 33 includes at least one lens and guides the light reflected by the reflective member 32 to the lens 34.

The lens 34 is disposed in an end part of the second member 103 on the direction X2 side in the form of closing the opening 3c formed in this end part. The lens 34 projects the light incident from the third optical system 33 to the projection target object 6.

The projection direction changing mechanism 104 is a rotation mechanism that rotatably connects the second member 103 to the first member 102. By the projection direction changing mechanism 104, the second member 103 is configured to be rotatable about a rotation axis (specifically, the optical axis K) that extends in the direction Y. The projection direction changing mechanism 104 is not limited to the disposition position illustrated in FIG. 4 as long as the projection direction changing mechanism 104 can rotate the optical system. In addition, the number of rotation mechanisms is not limited to one, and a plurality of rotation mechanisms may be provided.

The shift mechanism 105 is a mechanism for moving the optical axis K of the projection optical system (in other words, the optical unit 106) in a direction (direction Y in FIG. 4) perpendicular to the optical axis K. Specifically, the shift mechanism 105 is configured to be capable of changing a position of the first member 102 in the direction Y with respect to the body part 101. The shift mechanism 105 may manually move the first member 102 or electrically move the first member 102.

FIG. 4 illustrates a state where the first member 102 is moved as far as possible to the direction Y1 side by the shift mechanism 105. By moving the first member 102 in the direction Y2 via the shift mechanism 105 from the state illustrated in FIG. 4, a relative position between a center of the image (in other words, a center of a display surface) formed by the light modulation portion 22 and the optical axis K changes, and the image G1 projected to the projection target object 6 can be shifted (translated) in the direction Y2.

The shift mechanism 105 may be a mechanism that moves the light modulation portion 22 in the direction Y instead of moving the optical unit 106 in the direction Y. Even in this case, the image G1 projected to the projection target object 6 can be moved in the direction Y2.

<Projection Image Before and After Shifting>

FIG. 5 is a diagram illustrating an example of the projection image before shifting. FIG. 6 is a diagram illustrating an example of the projection image after shifting. In this example, as illustrated in FIG. 5, there is almost no color shading (for example, color unevenness) in the projection image projected to the projection range 11 before the control device 4 performs a control of shifting the projection range 11. On the other hand, it is assumed that color shading is generated in a right end part of the projection image projected to the projection range 11 as illustrated in FIG. 6 in a case where the control device 4 performs a control of shifting the projection range 11 to the right. This color shading is caused by, for example, reduction of light in an edge part of the projection optical system 23 that varies for each color (wavelength).

While the original image is, for example, an even white image (pixel values of each of red, green, and blue are "255"), balance among red, green, and blue is broken in the projection image projected to the projection range 11, and the pixel values of green and blue are decreased relative to the pixel values of red. Thus, reddish color unevenness occurs in the color shading illustrated in FIG. 6. In FIG. 6, this reddish color unevenness is represented by density of dots.

<Correction of Color Shading by Control Device 4>

FIG. 7 is a diagram illustrating an example of correction of the color shading by the control device 4. In the state illustrated in FIG. 6, the control device 4 performs a control of correcting the color shading (for example, color unevenness correction) of the projection image projected to the projection range 11. For example, correction of the color shading is reduction of the color unevenness or the like caused by the color shading.

Specifically, the control device 4 acquires a correction parameter corresponding to a shift position of the projection range 11 based on correspondence information indicating the correction parameter of the color shading corresponding to the shift position of the projection range 11 and performs the control of correcting the color shading based on the acquired correction parameter. The correspondence information may be a correspondence table in which each shift position of the projection apparatus 10 and the correction parameter of the color shading are associated with each other, or may be a function with which the correction parameter of the color shading can be derived from the shift position of the projection range 11.

For example, the correction parameter of the color shading is a gain for each color (red, green, and blue) with respect to each pixel of the image data input into the light modulation portion 22. The correction parameter may be a table showing the gain of each pixel for each color or may be a function with which the gain of each pixel for each color can be derived. In addition, the correction parameter of the color shading may be, for example, a correction parameter with which it is possible to suppress the color shading while maintaining brightness in each pixel.

The brightness is, for example, brightness calculated as an average of the pixel values of each of red, green, and blue. The average of the pixel values of each of red, green, and blue may be a weighted average such as pixel values of red×0.21+pixel values of green×0.72+pixel values of blue× 0.07 or may be a simple average.

In addition, the control device 4 performs the control of correcting the color shading based on combined use of output adjustment of the light source 21 used in the projection by the projection apparatus 10 and adjustment of the image data input into the light modulation portion 22. For example, the projection apparatus 10 may operate in a plurality of modes having different output powers of the light source 21. In this case, the control device 4 changes a pattern of the combined use of the output adjustment of the light source 21 used in the projection by the projection apparatus 10 and the adjustment of the image data input into the light modulation portion 22 depending on spare power of the output power of the light source 21 before correction of the color shading. The adjustment of the image data means changing the pixel values of the image data, that is, applying gains.

For example, in a case where the output power of the light source 21 is set to 100% before correction of the color shading, the control device 4 performs a control of decreasing the pixel values of red (applying a negative gain) in accordance with the generated color shading in the image data input into the light modulation portion 22. For example, in a case where the original image data is white image data in which the pixel values of each of red, green, and blue are "255" in the entire region, the control device 4 performs a control of setting the pixel values of red to "200" and of maintaining the pixel values of each of green and blue at "255" in a part in which the reddish color unevenness has occurred in the image data. Accordingly, the pixel values of red come closer to the pixel values of each of green and blue in the projection image projected to the projection range 11, and the color shading can be suppressed.

In addition, in a case where the output power of the light source 21 is set to 50% before correction of the color shading, the control device 4 first sets the output power of the light source 21 to 100% and performs a control of decreasing the pixel values of red, green, and blue in the image data input into the light modulation portion 22. For example, in a case where the original image data is white image data in which the pixel values of each of red, green, and blue are "255" in the entire region, the control device 4 performs a control of setting the pixel values of each of red, green, and blue in the image data to "128". The control device 4 performs a control of increasing the pixel values of green and blue in accordance with the generated color shading. For example, the control device 4 performs a control of setting the pixel values of each of green and blue to "160" and of maintaining the pixel values of red at "128" in a part in which the reddish color unevenness has occurred in the image data. Accordingly, the pixel values of red come closer to the pixel values of each of green and blue in the projection image projected to the projection range 11, and the color shading can be suppressed.

While the control of setting the pixel values of each of green and blue from "255" to "128" and then to "160" has been described for description, a control of directly changing the pixel values of each of green and blue from "255" to "160" may be used.

As described above, in a case where there is spare power for the output power of the light source 21, combining the adjustment of the image data input into the light modulation portion 22 with increasing of the output power of the light source 21 can suppress a change in brightness caused by correcting the color shading, that is, brightness unevenness or the like in a part in which the color shading is generated, while correcting the color shading. Thus, quality of the projection image projected to the projection range 11 can be improved.

By performing the above correction, the color shading (reddish color unevenness) that has occurred in the right end part of the projection image projected to the projection range 11 as illustrated in FIG. 6 can be reduced. Each pixel value described above is merely an example for description. In the actual control, each pixel value is determined based on each pixel value of the original image data and on the correction parameter of the color shading corresponding to the shift position of the projection range 11.

Furthermore, the control device 4 may correct brightness shading of the projection image projected to the projection range 11. While the color shading is reduction of light in the edge part of the projection optical system 23 that varies for each color, the brightness shading is reduction of light in the edge part of the projection optical system 23 that does not vary for each color, and is brightness unevenness of the projection image projected to the projection range 11.

For example, the control device 4 acquires a correction parameter corresponding to a shift position of the projection range 11 based on correspondence information indicating the correction parameter of the brightness shading corresponding to the shift position of the projection range 11 and performs the control of correcting the brightness shading based on the acquired correction parameter. The correspondence information may be a correspondence table in which each shift position of the projection apparatus 10 and the correction parameter of the brightness shading are associated with each other, or may be a function with which the correction parameter of the brightness shading can be derived from the shift position of the projection range 11.

For example, the correction parameter of the brightness shading is a gain with respect to each pixel of the image data input into the light modulation portion 22. The correction parameter may be a table showing the gain of each pixel or may be a function with which the gain of each pixel can be derived.

<Processing Performed by Control Device 4>

Figure 8:
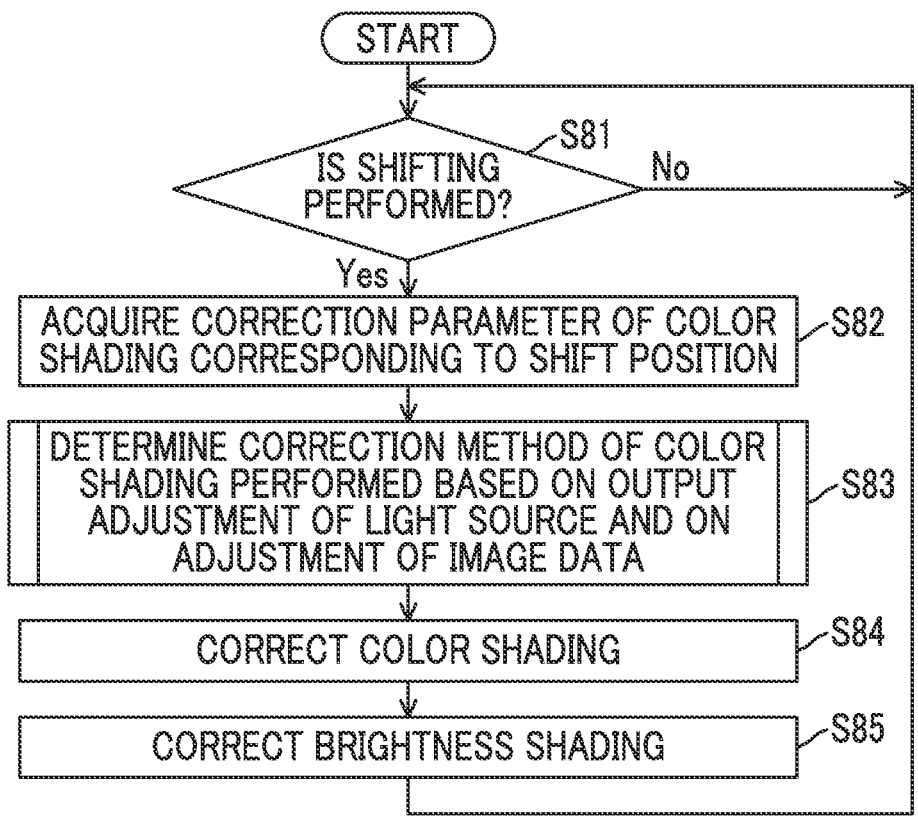
FIG. 8 is a flowchart illustrating an example of processing performed by the control device 4.

FIG. 8 is a flowchart illustrating an example of processing performed by the control device 4. For example, the control device 4 executes the processing illustrated in FIG. 8.

First, the control device 4 determines whether or not the projection range 11 is shifted (step S81) and waits until the projection range 11 is shifted (step S81: No loop). For example, the projection range 11 is shifted in accordance with a user operation performed on the operation reception portion 2.

In step S81, in a case where the projection range 11 is shifted (step S81: Yes), the control device 4 acquires the correction parameter of the color shading corresponding to a position of the projection apparatus 10 after shifting (shift position) using the correspondence information between the shift position and the correction parameter of the color shading (step S82).

Next, the control device 4 determines a correction method of the color shading performed based on the combined use of the output adjustment of the light source 21 used in the projection by the projection apparatus 10 and the adjustment of the image data input into the light modulation portion 22 (step S83). Determination of the correction method in step S83 will be described later in FIG. 9. Next, the control device 4 performs the control of correcting the color shading using the correction method determined in step S83 (step S84).

Next, the control device 4 performs the control of correcting the brightness shading of the projection image projected to the projection range 11 (step S85) and returns to step S81. In step S85, for example, the control device 4 acquires the correction parameter of the brightness shading corresponding to the position of the projection apparatus 10 after shifting (shift position) using the correspondence information between the shift position and the correction parameter of the brightness shading and performs the control of correcting the brightness shading based on the acquired correction parameter.

In addition, in step S85, the control device 4 corrects the brightness shading while maintaining a ratio of the gains of each of red, green, and blue adjusted in step S84. The control device 4 may correct the brightness shading based on only the adjustment of the image data input into the light modulation portion 22 or based on the combined use of the output adjustment of the light source 21 used in the projection by the projection apparatus 10 and the adjustment of the image data input into the light modulation portion 22.

As illustrated in FIG. 8, the control device 4 performs the control of correcting the color shading of the projection image projected to the projection range 11 based on the combined use of the output adjustment of the light source 21 and the adjustment of the image data input into the light modulation portion 22. Accordingly, for example, correction of the color shading can be more flexibly performed than correction of the color shading performed based on only the adjustment of the image data input into the light modulation portion 22.

Specifically, combining the adjustment of the image data input into the light modulation portion 22 with adjustment of the output power of the light source 21 can suppress a change in brightness caused by correcting the color shading, that is, brightness unevenness or the like in a part in which the color shading is generated, while correcting the color shading. Thus, the quality of the projection image projected to the projection range 11 can be improved.

In addition, the control device 4 may correct the brightness shading in a state where the color shading is corrected. Accordingly, the brightness shading that is generated separately from the color shading can also be suppressed. In addition, prioritizing correction of the color shading having a higher effect on the quality of the projection image projected to the projection range 11 over correction of the brightness shading can further improve the quality of the projection image projected to the projection range 11.

<Determination Processing of Correction Method of Color Shading>

Figure 9:
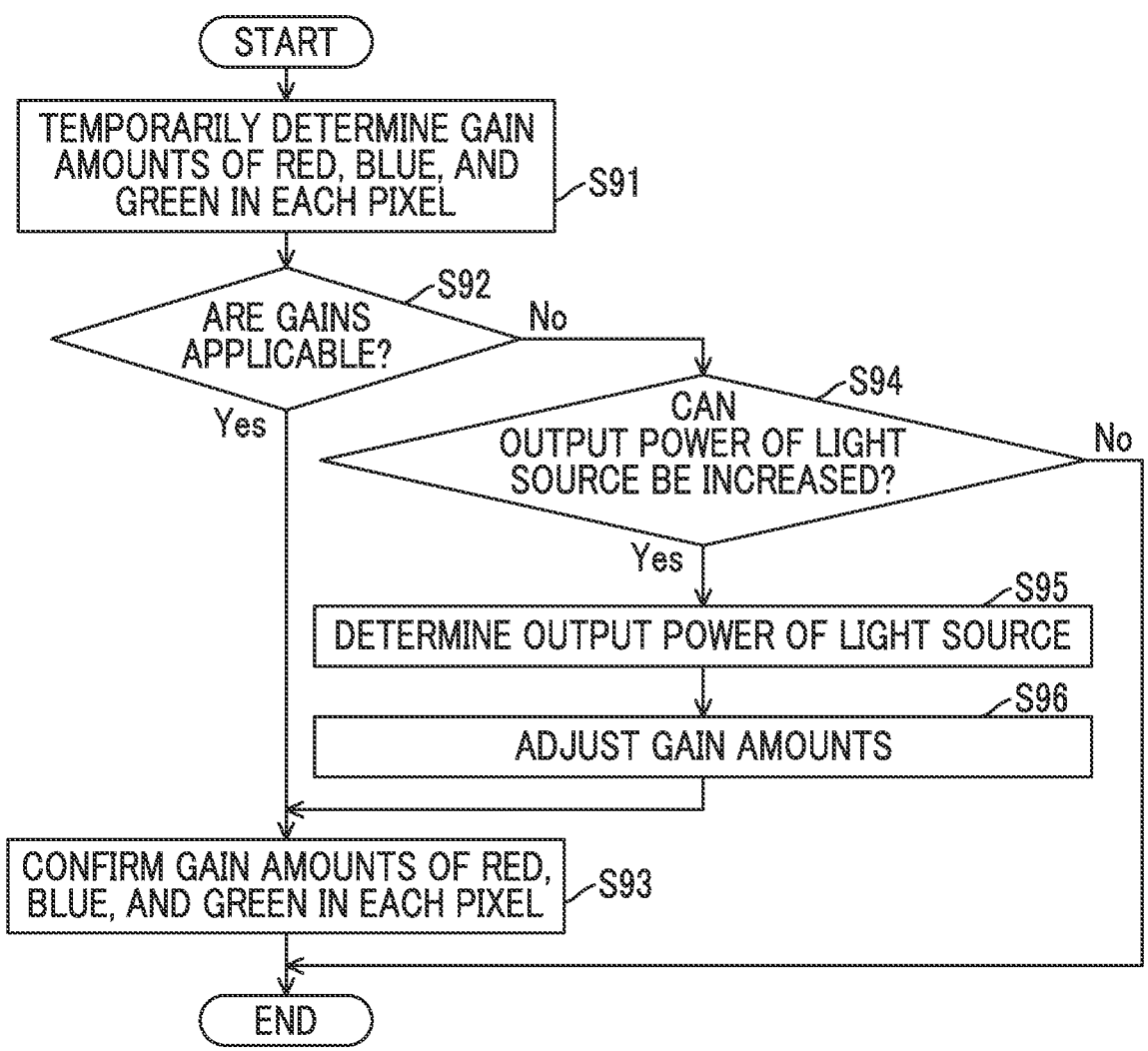
FIG. 9 is a flowchart illustrating an example of determination processing of a correction method of the color shading.

FIG. 9 is a flowchart illustrating an example of determination processing of the correction method of the color shading. In step S83 illustrated in FIG. 8, for example, the control device 4 performs the processing illustrated in FIG. 9 to determine the correction method of the color shading performed based on the combined use of the output adjustment of the light source 21 used in the projection by the projection apparatus 10 and the adjustment of the image data input into the light modulation portion 22.

First, the control device 4 temporarily determines gain amounts of red, blue, and green in each pixel of the image data based on the correction parameter of the color shading acquired in step S82 illustrated in FIG. 8 (step S91). As described above, the correction parameter of the color shading is a correction parameter with which it is possible to suppress the color shading while maintaining the brightness (for example, the average of the pixel values of each of red, green, and blue) in each pixel. The temporary determination in step S91 is performed by allowing an upper limit value in the light modulation portion 22, described later, to be exceeded.

Next, the control device 4 determines whether or not gains are applicable to the image data input into the light modulation portion 22 based on the gain amounts temporarily determined in step S91 (step S92). For example, the control device 4 determines whether or not gains are applicable by determining whether or not the pixel values of each of red, blue, and green in each pixel of the image data are less than or equal to an upper limit value (for example, "255") in the light modulation portion 22 in a case where gains are applied to the image data using the gain amounts temporarily determined in step S91.

In step S92, in a case where gains are applicable (step S92: Yes), the control device 4 confirms the gain amounts temporarily determined in step S91 as gain amounts of red, blue, and green in each pixel of the image data (step S93) and ends the series of processes.

In step S92, in a case where gains are not applicable (step S92: No), the control device 4 determines whether or not the output power of the light source 21 can be increased (step S94). For example, the control device 4 determines whether or not the current output power of the light source 21 is less than an upper limit value of the output power of the light source 21.

In step S94, in a case where the output power of the light source 21 can be increased (step S94: yes), the control device 4 determines an amount of increase in the output power of the light source 21 (step S95). For example, the control device 4 may determine an amount of increase with which the output power of the light source 21 is increased to the upper limit, or may determine the minimum amount of increase that can be used in combination with the adjustment of the image data input into the light modulation portion 22 to suppress the color shading.

Next, the control device 4 adjusts the gain amounts temporarily determined in step S91 to be less than or equal to the upper limit value in the light modulation portion 22 based on the amount of increase in the output power of the light source 21 determined in step S95 (step S96). For example, the control device 4 adjusts the gain amounts of red, blue, and green in each pixel such that the pixel values of each of red, blue, and green in each pixel are less than or equal to the upper limit value in the light modulation portion 22 while the ratio of the gain amounts between colors is maintained.

As an example, in a case of multiplying the output power of the light source 21 by N, the control device 4 adjusts the gain amounts of red, blue, and green in each pixel of the image data to 1/N of the gain amounts temporarily determined in step S91. Accordingly, it is possible to derive gain amounts with which a change in the brightness caused by correcting the color shading can be suppressed, while correcting the color shading.

In a case where the gain amounts cannot be adjusted to be less than or equal to the upper limit value in the light modulation portion 22 because of an insufficient amount of increase in the output power of the light source 21, the control device 4 adjusts the gain amounts of red, blue, and green in each pixel of the image data such that the highest pixel value is the upper limit value in the light modulation portion 22 while the ratio of the gain amounts between colors temporarily determined in step S91 is maintained. Accordingly, it is possible to derive gain amounts with which a change in the brightness caused by correcting the color shading can be suppressed to the minimum extent, while correcting the color shading.

After step S96, the control device 4 transitions to step S93 to confirm the gain amounts adjusted in step S96 as the gain amounts of red, blue, and green in each pixel of the image data and ends the series of processes.

In a case where the gain amounts of red, blue, and green in each pixel of the image data are confirmed in step S93, the control device 4, in correcting the color shading in step S84 illustrated in FIG. 8, performs a control of applying gains to the image data input into the light modulation portion 22 using the confirmed gain amounts of red, blue, and green in each pixel of the image data. In addition, in a case where the amount of increase in the output power of the light source 21 is determined in step S95, the control device 4, in correcting the color shading in step S84 illustrated in FIG. 8, performs a control of increasing the output power of the light source 21 using the determined amount of increase.

In step S84, in a case where the output power of the light source 21 cannot be increased (step S94: No), the control device 4 ends the series of processes. In this case, the control device 4 does not correct the color shading in step S84 illustrated in FIG. 8. Alternatively, in this case, the control device 4, in correcting the color shading in step S94 illustrated in FIG. 8, may perform the control of applying gains to the image data input into the light modulation portion 22 using the gain amounts of red, blue, and green in each pixel of the image data that are adjusted such that the highest pixel value is the upper limit value in the light modulation portion 22 while the ratio of the gain amounts between colors temporarily determined in step S91 is maintained.

As described above, the control device 4 performs a control of switching the pattern of the combined use of the output adjustment of the light source 21 used in the projection by the projection apparatus 10 and the adjustment of the image data input into the light modulation portion 22 based on the output of the light source 21. Accordingly, the color shading can be corrected by flexibly switching the pattern of the combined use of the output adjustment of the light source 21 used in the projection by the projection apparatus 10 and the adjustment of the image data input into the light modulation portion 22 depending on the spare power of the output of the light source 21.

In addition, the control device 4 performs the control of switching the pattern of the combined use of the output adjustment of the light source 21 used in the projection by the projection apparatus 10 and the adjustment of the image data input into the light modulation portion 22 based on the image data input into the light modulation portion 22. Specifically, the control device 4 performs the control of switching the pattern of the combined use based on the pixel values of each color of the image data input into the light modulation portion 22 and on the maximum value of the pixel values of each color in the light modulation portion 22.

For example, in a case where suppressing the color shading while maintaining the brightness (for example, the average of the pixel values of each of red, green, and blue) is possible based on only the adjustment (for example, the gains) of the pixel values of the image data input into the light modulation portion 22 within a restricted range (for example, the upper limit value), the control device 4 performs the control of correcting the color shading based on the adjustment of the image data input into the light modulation portion 22. In addition, in a case where suppressing the color shading while maintaining the brightness is not possible based on only the adjustment of the pixel values of the image data input into the light modulation portion 22 within the restricted range, the control device 4 performs the control of correcting the color shading based on the output adjustment of the light source 21 and on the adjustment of the image data input into the light modulation portion 22.

Maintaining the brightness means maintaining the brightness to an extent in which an effect on an actual look of the projection image can be ignored, and includes changing the brightness within a range in which the effect on the actual look of the projection image can be ignored.

Modification Example 1

While a configuration of bending the optical axis K twice using the reflective member 122 and the reflective member 32 has been described in FIG. 3 and FIG. 4 as the configuration of the projection apparatus 10, it may be configured to not bend the optical axis K by omitting the reflective member 122 and the reflective member 32, or it may be configured to bend the optical axis K once by omitting any of the reflective member 122 and the reflective member 32.

Figure 10:
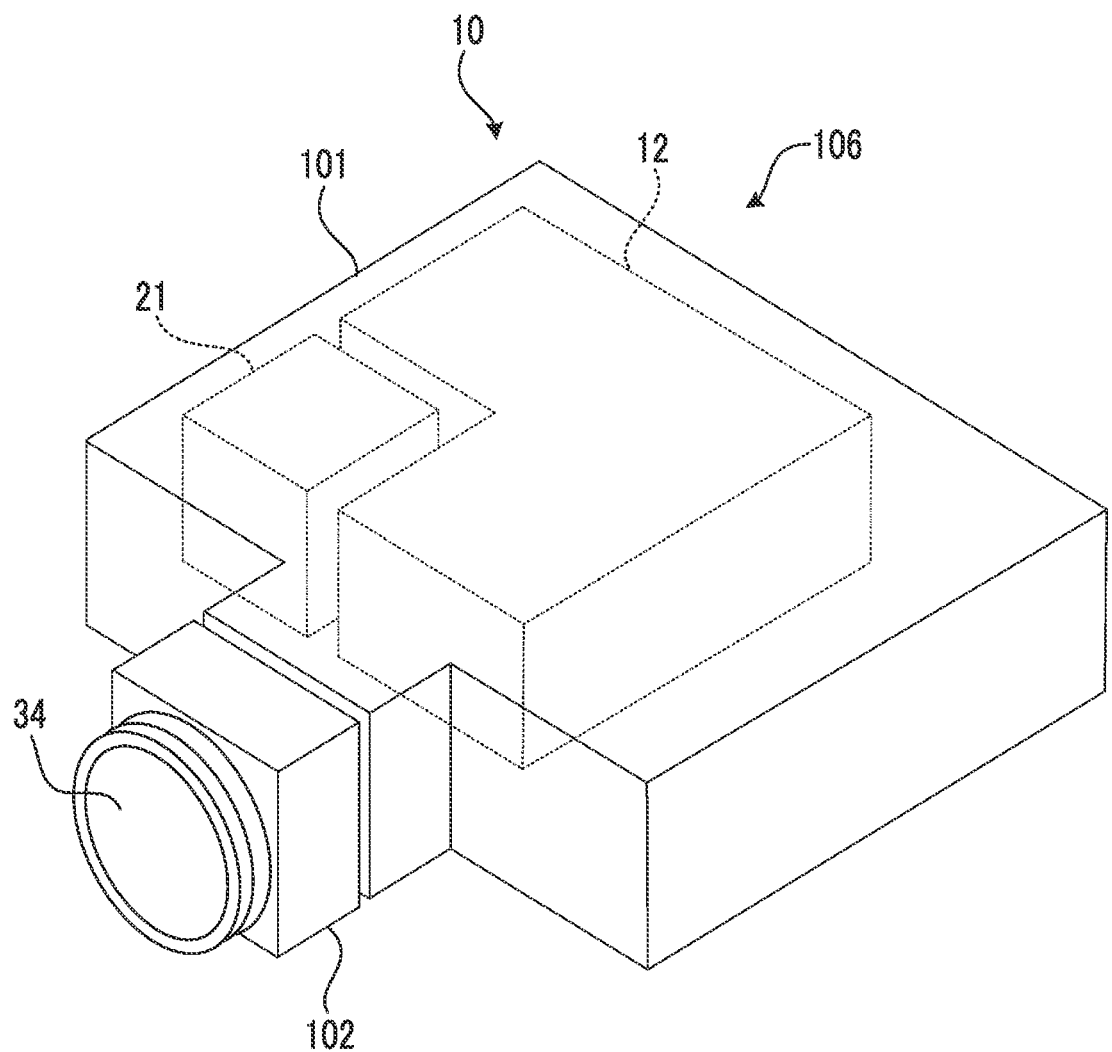
FIG. 10 is a schematic diagram illustrating another exterior configuration of the projection apparatus 10.
Figure 11:
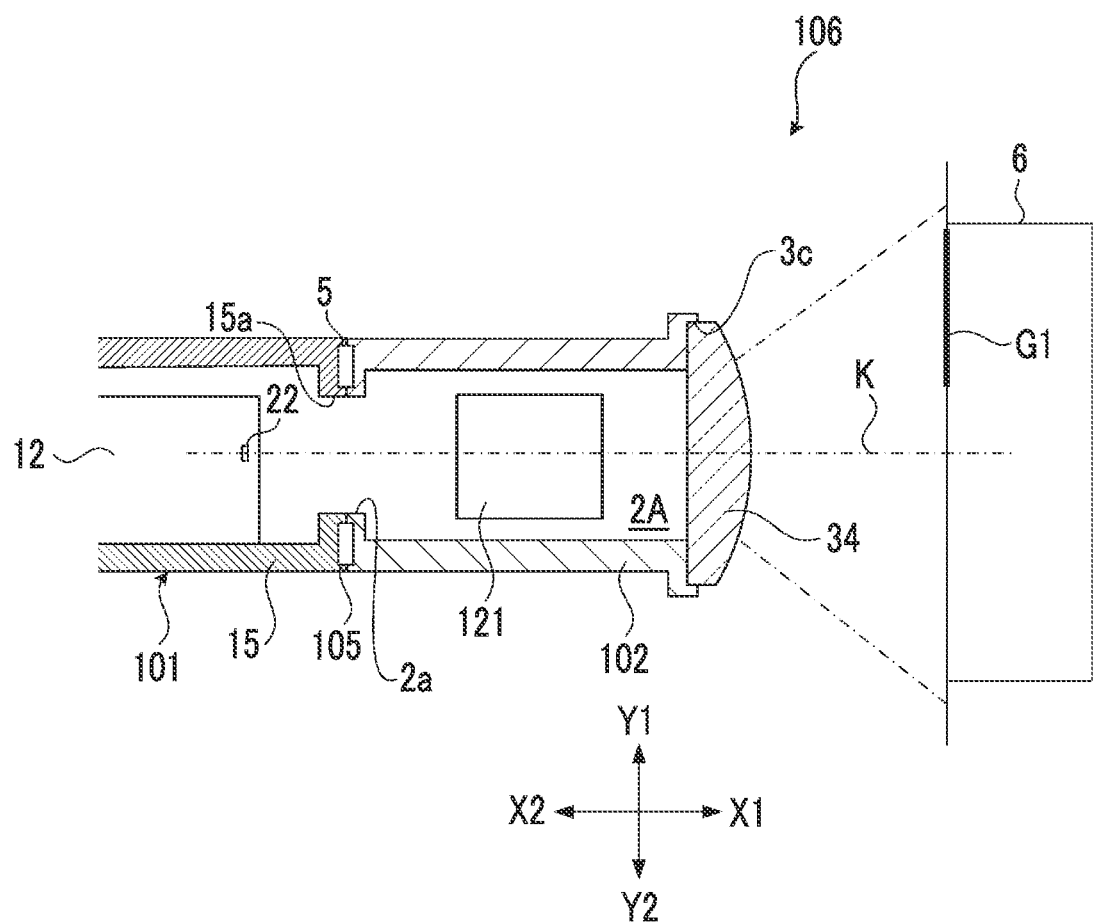
FIG. 11 is a schematic cross-sectional view of the optical unit 106 of the projection apparatus 10 illustrated in FIG. 10.

FIG. 10 is a schematic diagram illustrating another exterior configuration of the projection apparatus 10. FIG. 11 is a schematic cross-sectional view of the optical unit 106 of the projection apparatus 10 illustrated in FIG. 10. The same parts as the parts illustrated in FIG. 3 and FIG. 4 will be designated by the identical reference numerals in FIG. 10 and FIG. 11, and those parts will not be described.

The optical unit 106 illustrated in FIG. 10 comprises the first member 102 supported by the body part 101 and does not comprise the second member 103 illustrated in FIG. 3 and FIG. 4. In addition, the optical unit 106 illustrated in FIG. 10 does not comprise the reflective member 122, the second optical system 31, the reflective member 32, the third optical system 33, and the projection direction changing mechanism 104 illustrated in FIG. 3 and FIG. 4.

In the optical unit 106 illustrated in FIG. 10, the projection optical system 23 illustrated in FIG. 2 is composed of the first optical system 121 and of the lens 34. The optical axis K of the projection optical system 23 is illustrated in FIG. 11. The first optical system 121 and the lens 34 are disposed in this order from the light modulation portion 22 side along the optical axis K.

The first optical system 121 guides the light that is incident on the first member 102 from the body part 101 and that travels in the direction X1, to the lens 34. The lens 34 is disposed in an end part of the body part 101 on the direction X1 side in the form of closing the opening 3c formed in this end part. The lens 34 projects the light incident from the first optical system 121 to the projection target object 6.

Modification Example 2

While a configuration in which the control device 4 performs the control of correcting the color shading based on the shift position of the projection range 11 has been described, the present invention is not limited to such a configuration. For example, the control device 4 may be configured to perform the control of correcting the color shading based on the output adjustment of the light source 21 and on the adjustment of the image data input into the light modulation portion 22 independently of the shift position of the projection range 11. In this case, the projection apparatus 10 may not be configured to shift the projection range 11.

Modification Example 3

While a case of applying the control device of the embodiment to the projection apparatus 10 has been described, the present invention is not limited to such a configuration. For example, the control device of the embodiment may be other devices that can directly or indirectly communicate with the projection apparatus 10. For example, the control device of the embodiment may be an information terminal such as a personal computer or a smartphone capable of communicating with the projection apparatus 10. In this case, the control device of the embodiment communicates with the projection apparatus 10 to execute the above various controls.

At least the following matters are disclosed in the present specification.

(1) A control device of a projection apparatus that projects an image optically modulated by a light modulation element, the control device comprising a processor, in which the processor is configured to perform a control of correcting color shading of a projection image that is projected, based on combined use of output adjustment of a light source used in the projection by the projection apparatus and adjustment of image data input into the light modulation element.

(2) The control device according to (1), in which the projection apparatus is capable of shifting a projection range of the image, and the processor is configured to perform the control of correcting the color shading based on a shift position of the projection range.

(3) The control device according to (2), in which the processor is configured to perform the control of correcting the color shading based on information indicating a correction parameter corresponding to the shift position.

(4) The control device according to any one of (1) to (3), in which the processor is configured to perform a control of correcting brightness shading of the image in a state where the color shading is corrected.

(5) The control device according to any one of (1) to (4), in which the processor is configured to perform a control of switching a pattern of the combined use based on output of the light source.

(6) The control device according to any one of (1) to (5), in which the processor is configured to perform a control of switching a pattern of the combined use based on the image data.

(7) The control device according to (6), in which the processor is configured to perform the control of switching the pattern of the combined use based on a pixel value of each color of the image data and on a restricted range of a pixel value of each color in the light modulation element.

(8) The control device according to (7), in which the processor is configured to, in a case where suppressing the color shading while maintaining brightness is possible based on only adjustment of the pixel value of the image data within the restricted range, perform the control of correcting the color shading based on the adjustment of the image data, and in a case where suppressing the color shading while maintaining the brightness is not possible based on only the adjustment of the pixel value of the image data within the restricted range, perform the control of correcting the color shading based on the output adjustment of the light source used in the projection by the projection apparatus and on the adjustment of the image data.

(9) A control method performed by a control device of a projection apparatus that projects an image optically modulated by a light modulation element, the control method comprising performing, via a processor of the control device, a control of correcting color shading of a projection image that is projected, based on combined use of output adjustment of a light source used in the projection by the projection apparatus and adjustment of image data input into the light modulation element.

(10) The control method according to (9), in which the projection apparatus is capable of shifting a projection range of the image, and the processor is configured to perform the control of correcting the color shading based on a shift position of the projection range.

(11) The control method according to (10), in which the processor is configured to perform the control of correcting the color shading based on information indicating a correction parameter corresponding to the shift position.

(12) The control method according to any one of (9) to (11), in which the processor is configured to perform a control of correcting brightness shading of the image in a state where the color shading is corrected.

(13) The control method according to any one of (9) to (12), in which the processor is configured to perform a control of switching a pattern of the combined use based on output of the light source.

(14) The control method according to any one of (9) to (13), in which the processor is configured to perform a control of switching a pattern of the combined use based on the image data.

(15) The control method according to (14), in which the processor is configured to perform the control of switching the pattern of the combined use based on a pixel value of each color of the image data and on a restricted range of a pixel value of each color in the light modulation element.

(16) The control method according to (15), in which the processor is configured to, in a case where suppressing the color shading while maintaining brightness is possible based on only adjustment of the pixel value of the image data within the restricted range, perform the control of correcting the color shading based on the adjustment of the image data, and in a case where suppressing the color shading while maintaining the brightness is not possible based on only the adjustment of the pixel value of the image data within the restricted range, perform the control of correcting the color shading based on the output adjustment of the light source used in the projection by the projection apparatus and on the adjustment of the image data.

(17) A control program of a projection apparatus that projects an image optically modulated by a light modulation element, the control program causing a processor configured to control the projection apparatus to execute a process comprising performing a control of correcting color shading of a projection image that is projected, based on combined use of output adjustment of a light source used in the projection by the projection apparatus and adjustment of image data input into the light modulation element.

(18) A projection apparatus comprising a projection portion that projects an image optically modulated by a light modulation element, and a control device that performs a control of correcting color shading of a projection image that is projected, based on combined use of output adjustment of a light source used in the projection by the projection portion and adjustment of image data input into the light modulation element.

While various embodiments have been described above with reference to the drawings, the present invention is, of course, not limited to such examples. It is apparent that those skilled in the art may perceive various modification examples or correction examples within the scope disclosed in the claims, and those examples are also understood as falling within the technical scope of the present invention. In addition, each constituent in the embodiment may be arbitrarily combined without departing from the gist of the invention.

The present application is based on Japanese Patent Application (JP2021-030085) filed on Feb. 26, 2021, the content of which is incorporated in the present application by reference.

EXPLANATION OF REFERENCES

1: projection portion
2: operation reception portion
2A, 3A: hollow portion
2a, 2b, 3a, 3c, 15a: opening
4: control device
4a: storage medium
6: projection target object
10: projection apparatus
11: projection range
12: light modulation unit
15: housing
21: light source
22: light modulation portion
23: projection optical system
24: control circuit
31: second optical system
32, 122: reflective member
33: third optical system
34: lens
101: body part
102: first member
103: second member
104: projection direction changing mechanism
105: shift mechanism
106: optical unit
121: first optical system
G1: image

What is claimed is:

1. A control device of a projection apparatus that projects an image optically modulated by a light modulation element, the control device comprising:
a processor,
wherein the processor is configured to perform a control of correcting color shading of a projection image that is projected, based on combined use of output adjustment of a light source used in the projection by the projection apparatus and adjustment of image data input into the light modulation element, and
wherein the processor is further configured to:
determine whether the color shading can be suppressed based on only adjustment of the pixel value of the image data within a restricted range of a pixel value of each color in the light modulation element;
in a case where suppressing the color shading while maintaining brightness is possible based on only adjustment of the pixel value of the image data within the restricted range, perform the control of correcting the color shading based on the adjustment of the image data; and
in a case where suppressing the color shading while maintaining the brightness is not possible based on only the adjustment of the pixel value of the image data within the restricted range, perform the control of correcting the color shading based on the output adjustment of the light source used in the projection by the projection apparatus and on the adjustment of the image data.

2. The control device according to claim 1,
wherein the projection apparatus is capable of shifting a projection range of the image, and
the processor is configured to perform the control of correcting the color shading based on a shift position of the projection range.

3. The control device according to claim 2,
wherein the processor is configured to perform the control of correcting the color shading based on information indicating a correction parameter corresponding to the shift position.

4. The control device according to claim 1,
wherein the processor is configured to perform a control of correcting brightness shading of the image in a state where the correcting of the color shading is performed.

5. The control device according to claim 1,
wherein the processor is configured to perform a control of switching a pattern of the combined use based on output of the light source.

6. The control device according to claim 1,
wherein the processor is configured to perform a control of switching a pattern of the combined use based on the image data.

7. The control device according to claim 6,
wherein the processor is configured to perform the control of switching the pattern of the combined use based on the pixel value of each color of the image data and on the restricted range.

8. The control device according to claim 1,
wherein when determining whether the color shading can be suppressed based on only adjustment of the pixel value of the image data within the restricted range of the pixel value of each color in the light modulation element, the processor is further configured to:
temporarily determine gain amounts of each of red, blue, and green in each pixel of the image data based on a correction parameter of the color shading; and
determine if gains of the correction parameter are applicable to the image data input into the light modulation portion based on the temporary gain amounts that were determined;
wherein the control of correcting color shading of the projection image that is projected is performed based on the determination if the gain of the correction parameter are applicable to the image data input into the light modulation portion.

9. A control method performed by a control device of a projection apparatus that projects an image optically modulated by a light modulation element, the control method comprising:
performing, via a processor of the control device, a control of correcting color shading of a projection image that is projected, based on combined use of output adjustment of a light source used in the projection by the projection apparatus and adjustment of image data input into the light modulation element,
wherein the method further comprises, via the processor:
determining whether the color shading can be suppressed based on only adjustment of the pixel value of the image data within a restricted range of a pixel value of each color in the light modulation element;

in a case where suppressing the color shading while maintaining brightness is possible based on only adjustment of the pixel value of the image data within the restricted range, performing the control of correcting the color shading based on the adjustment of the image data; and in a case where suppressing the color shading while maintaining the brightness is not possible based on only the adjustment of the pixel value of the image data within the restricted range, performing the control of correcting the color shading based on the output adjustment of the light source used in the projection by the projection apparatus and on the adjustment of the image data.

10. The control method according to claim 9,
wherein the projection apparatus is capable of shifting a projection range of the image, and
the method comprises: performing, via the processor, the control of correcting the color shading based on a shift position of the projection range.

11. The control method according to claim 10,
wherein the method comprises: performing, via the processor, the control of correcting the color shading based on information indicating a correction parameter corresponding to the shift position.

12. The control method according to claim 9,
wherein the method comprises: performing, via the processor, a control of correcting brightness shading of the image in a state where the color shading is corrected.

13. The control method according to claim 9,
wherein the method comprises: performing, via the processor, a control of switching a pattern of the combined use based on output of the light source.

14. The control method according to claim 9,
wherein the method comprises: performing, via the processor, a control of switching a pattern of the combined use based on the image data.

15. The control method according to claim 14,
wherein the method comprises: performing, via the processor, the control of switching the pattern of the combined use based on the pixel value of each color of the image data and on the restricted range.

16. A non-transitory computer readable medium storing a control program of a projection apparatus that projects an image optically modulated by a light modulation element, the control program causing a processor configured to control the projection apparatus to execute a process comprising:

performing a control of correcting color shading of a projection image that is projected, based on combined use of output adjustment of a light source used in the projection by the projection apparatus and adjustment of image data input into the light modulation element, wherein the process further comprises:
determining whether the color shading can be suppressed based on only adjustment of the pixel value of the image data within a restricted range of a pixel value of each color in the light modulation element;

in a case where suppressing the color shading while maintaining brightness is possible based on only adjustment of the pixel value of the image data within the restricted range, performing the control of correcting the color shading based on the adjustment of the image data; and in a case where suppressing the color shading while maintaining the brightness is not possible based on only the adjustment of the pixel value of the image data within the restricted range, performing the control of correcting the color shading based on the output adjustment of the light source used in the projection by the projection apparatus and on the adjustment of the image data.

17. A projection apparatus comprising:
projector that projects an image optically modulated by a light modulation element; and
a processor that is configured to perform a control of correcting color shading of a projection image that is projected, based on combined use of output adjustment of a light source used in the projection by the projector and adjustment of image data input into the light modulation element, wherein the processor is further configured to:
determine whether the color shading can be suppressed based on only adjustment of the pixel value of the image data within a restricted range of a pixel value of each color in the light modulation element;

in a case where suppressing the color shading while maintaining brightness is possible based on only adjustment of the pixel value of the image data within the restricted range, perform the control of correcting the color shading based on the adjustment of the image data; and in a case where suppressing the color shading while maintaining the brightness is not possible based on only the adjustment of the pixel value of the image data within the restricted range, perform the control of correcting the color shading based on the output adjustment of the light source used in the projection by the projection apparatus and on the adjustment of the image data.

* * * * *